United States Patent [19]
Hoffmann et al.

[11] Patent Number: 6,050,296
[45] Date of Patent: Apr. 18, 2000

[54] CONTROL APPARATUS

[75] Inventors: Heinfried Hoffmann, Frankfurt am Main; Lothar Kemmler, Moerfelden-Walldorf; Joerg Kiesbauer, Eppertshausen, all of Germany

[73] Assignee: Samson Aktiengesellschaft, Frankfurt, Germany

[21] Appl. No.: 09/089,824

[22] Filed: Jun. 3, 1998

[30] Foreign Application Priority Data

Jun. 3, 1997 [DE] Germany ............................ 197 23 207

[51] Int. Cl.$^7$ .................................................. F16K 49/00
[52] U.S. Cl. ........................ 137/552; 137/554; 137/557; 251/335.3; 73/40; 374/4
[58] Field of Search ..................... 137/554, 557, 137/552; 251/335.3; 73/40, 46; 374/4

[56] References Cited

U.S. PATENT DOCUMENTS

| | | | |
|---|---|---|---|
| 3,938,544 | 2/1976 | Bernaerts | 137/551 |
| 4,901,751 | 2/1990 | Story et al. | 137/312 |
| 4,972,867 | 11/1990 | Ruesch | 137/312 |
| 5,203,370 | 4/1993 | Block et al. | 137/312 |
| 5,287,881 | 2/1994 | Szatmary | 137/312 |
| 5,345,812 | 9/1994 | Haboian | 137/557 |
| 5,586,576 | 12/1996 | Franke et al. | 137/312 |

*Primary Examiner*—A. Michael Chambers
*Attorney, Agent, or Firm*—Hill & Simpson

[57] ABSTRACT

The invention relates to a control apparatus, comprising an actuating drive and an actuator connected therewith, whereby the actuator comprises at least one valve face and a throttle element that works herewith. The throttle element can be moved relative to the valve face by means of an actuating spindle connected with the actuating drive for the execution of a rotational and/or piston motion. The actuating spindle is sealed against the valve interior chamber at a first sealing location. A second sealing location likewise seals the actuating spindle, and, between the two sealing locations. There is a test chamber that is accessible via at least one control terminal, to which chamber a pressure sensor is connected. The pressure sensor is connected with an evaluation unit for monitoring the operation of the control apparatus. The signal output of the pressure sensor can be compared, in the evaluation unit, with a response threshold dependent on at least one temperature signal, for the outputting of an error status message to an error status output of the evaluation unit.

15 Claims, 1 Drawing Sheet

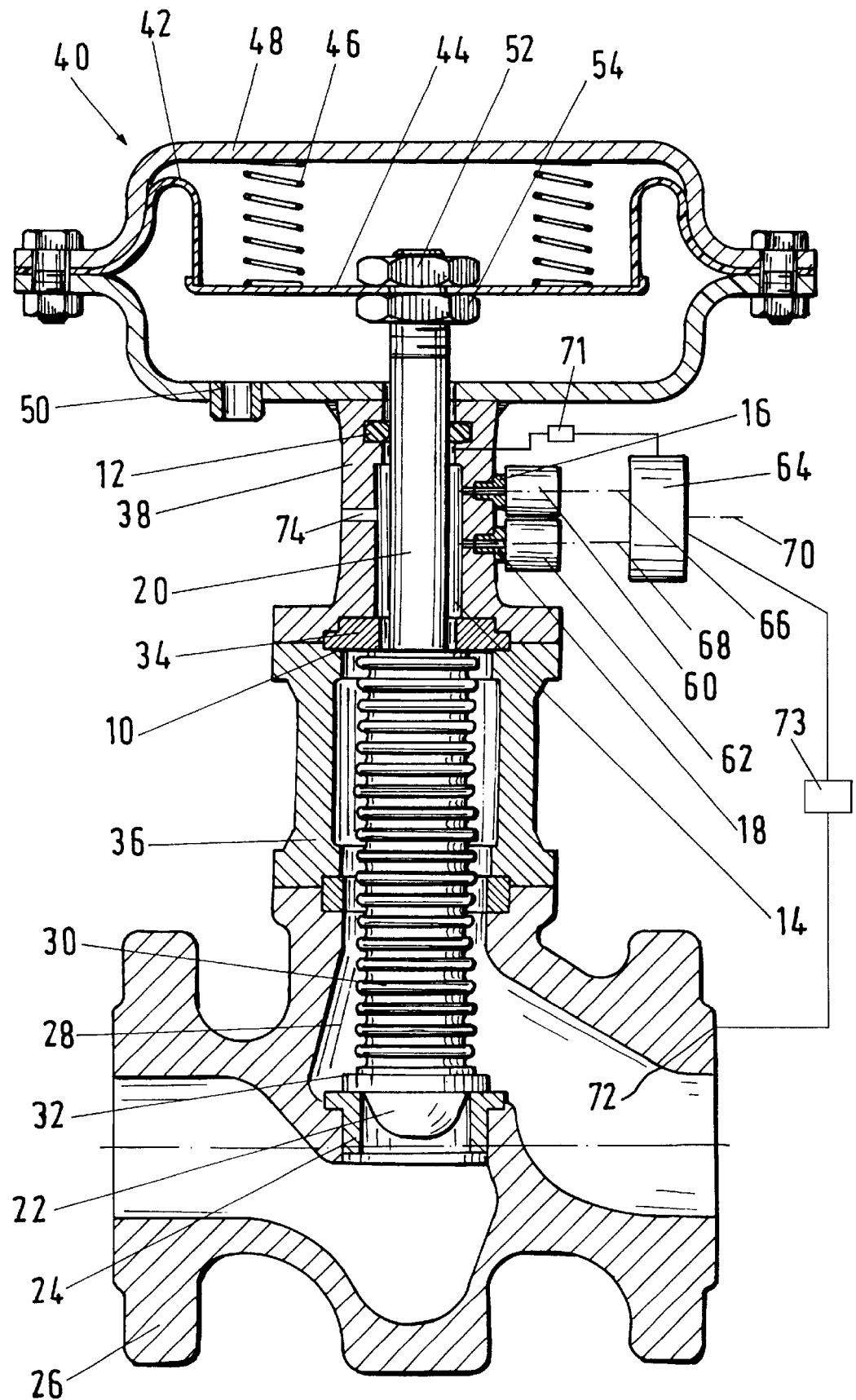

CONTROL APPARATUS

BACKGROUND OF THE INVENTION

Field of the Invention

The present invention relates to a final controlling apparatus or control apparatus. More specifically, the present invention relates to a control apparatus used to control the flow of liquid or gas through a valve housing.

Control apparatuses with sealing means, particularly for sealing actuating spindles, are known, comprising stuffing boxes, O-rings, bellows, or also combinations of these. Thus, in particular to meet increased tightness requirements, e.g. in the use of environmentally harmful gases, control apparatuses are provided with double stuffing boxes or bellows seals with additional stuffing boxes as a security seal. Such control apparatuses are disclosed, for example, by G. Strohrmann in atp—Automatisierungstechnische Praxis 32 (1990) 10, part 1, pediatric patients. 479 to 488, and atp—Automatisierungstechnische Praxis 37 (1995) 7, part 1, pediatric patients. 22 to 41. It can also be learned from these references that in order to check the functioning of a bellows, or also the rinsing or drying (given chlorine) of the space around a bellows, given the use of at least two seals for an actuating spindle, a control terminal, also designated a warning terminal or revision terminal, can be arranged between the corresponding sealing locations.

Also known is the monitoring of the tightness by connecting gas sensors that are suited to detect the respective process medium. Gas sensors of this sort are often called "sniffers" in the professional jargon, and have the disadvantage that they can be used only for particular media, and their exchangeability is thus limited.

The reference EP 0 637 713 A1 discloses a device of this species for sealing an actuating spindle, in which a pressure sensor, for monitoring the tightness of a stuffing box, is used, by converting the measured pressure into an electrical signal and evaluating it in a downstream processor. A leakage that leads to a pressure buildup in a corresponding stuffing box can thereby be recognized using the pressure sensor and the processor.

However, the known monitoring of the tightness using such a pressure sensor has the disadvantage that all pressure changes, such as those arising for example due to temperature changes or due to piston movements of a bellows, and volume changes caused thereby, are misinterpreted as a possible lack of tightness. Since gas sensors are less sensitive to disturbances, i.e., temperature changes and piston movements during operation do not necessarily influence a gas sensor, they are generally preferred in practice to pressure sensors.

The outward sealing of a valve inner chamber, above all in the area of the actuating spindle, and the monitoring of the tightness are of increasing importance, particularly in connection with the technical manual Air (TA Luft).

SUMMARY OF THE INVENTION

The present invention provides a control apparatus comprising an actuating drive and an actuator connected therewith, whereby the actuator comprises at least a valve face and a choke or throttle element that works with the actuator. The throttle element can be moved relative to the valve face by means of an actuating spindle connected with the actuating drive for the execution of a rotational and/or piston motion. The actuating spindle is sealed against the valve interior chamber at a first sealing location. A second sealing location likewise seals the actuating spindle, and, between the two sealing locations. There is a test chamber that is accessible via at least one control terminal, to which chamber a pressure sensor is connected, which, for its part, is connected with an evaluation unit for monitoring the operation of the final controlling apparatus.

The object of the present invention is thus further to develop the control apparatus of this species in such a way that the disadvantages of the prior art are overcome, i.e., in particular the sealing of the actuating spindle is monitored by the pressure sensor in such a way that disturbing influences are essentially reliably ruled out.

This object is solved according to the invention in that the signal output of the pressure sensor in the evaluation unit can be compared with a response threshold that depends on at least one temperature signal for the outputting of an error status message to an error status output of the evaluation unit.

In an inventive embodiment, it can thereby be provided that the operating temperature of the process medium of the control apparatus can be acquired, and the response threshold can be modified dependent on the operating temperature.

The invention also proposes that the evaluation unit comprises an adjustment means via which a temperature signal corresponding to the operating temperature can be set.

Another embodiment of the invention is characterized in that the test chamber comprises a further control terminal to which a temperature sensor is connected that acquires the temperature in the test chamber and has a signal output, connected with the evaluation unit, for a temperature signal, and the response threshold can be modified dependent on the temperature in the test chamber.

In addition, the invention proposes that the response threshold can be increased step-by-step as the temperature increases.

Alternatively, it can also be provided that the response threshold can be modified proportionally to the temperature signal.

According to the invention, it is also proposed that the evaluation unit operates in the manner of a boundary value switch for the signal output of the pressure sensor, and the boundary value can be modified dependent on the signal output of the temperature sensor.

A preferred embodiment of the invention is characterized by a unit that acquires the position of the actuating spindle, said unit being connected with the evaluation unit and modifying the response threshold dependent on the position of the actuating spindle.

According to the invention, the evaluation unit can advantageously be part of a positioner.

It is also preferred according to the invention that the evaluation unit comprise a microprocessor.

It can thereby be provided that the microprocessor forms the quotient of the pressure signal and the temperature signal, and, given a deviation exceeding the response threshold, produces a signal representing the error at the error status output.

The invention also proposes that the microprocessor forms the product of the position of the actuating spindle and the quotient of the pressure signal and the temperature signal, and, given a deviation exceeding the response threshold, produces a signal representing the error at the error status output.

According to the invention, it can likewise be provided that a housing extension is provided between the actuating drive and the actuator, in order to protect the actuating drive against high temperatures, and the response threshold depends on the type and length of this housing extension.

In addition, the invention proposes that an opening to the atmosphere, acting as a throttle, is present in a control terminal or in the test chamber.

Finally, it can also be provided according to the invention that the evaluation unit comprises a chronological filter that has a logical connection with the response threshold and suppresses momentary pressure changes.

The invention is thus based on the surprising finding that, in particular, temperature influences, and also, if warranted, changes in volume, due e.g. to piston motions of an actuating spindle, are so closely connected, as disturbances of the pressure in the test chamber, with the process medium and the control apparatus itself that, for the more reliable monitoring of the control apparatus, the evaluation unit itself must form a part of the control apparatus. As a result, the evaluation unit supplies a reliable error status output independent of the temperature and position of the actuating spindle, if, besides the analysis of said disturbances on the pressure, the temperature influence, and preferably the volume influence, is also taken into account by means of an adaptation of a response threshold directly at the control apparatus.

In an embodiment, the present invention provides a control apparatus which comprises an actuating drive connected to an actuator. The actuator comprises a throttle element and a spindle which connects the throttle element to the actuating drive. The actuator further comprises a valve chamber, a valve face in a valve housing. The spindle extends between the actuating drive and the valve chamber. The actuating drive moves the spindle on throttle element so that throttle element is moved relative to the valve face thereby either preventing flow of fluid through the valve chamber when the throttle element engages the valve face or permitting flow of fluid through the valve chamber when the throttle element is moved off of the valve face. The spindle is sealed against the valve housing at two sealing locations thereby isolating the valve chamber from the actuating drive. The actuator further comprises a test chamber disposed between the spindle and the valve housing. The test chamber is also disposed between the first and second sealing locations. The test chamber is in communication with at least one control terminal. The control terminal is in communication with a pressure sensor. The pressure sensor is in communication with an evaluation unit for monitoring the operation of the control apparatus. The pressure sensor generates an output pressure signal which is communicated to the evaluation unit. The evaluation unit compares the communicated output pressure signal with a response threshold dependent upon at least temperature signal. In the event the communicated output pressure signal differs from the response threshold by an amount in excess of a predetermined amount, the evaluation unit generates an error message.

In an embodiment, the apparatus further comprises a temperature sensor for measuring the temperature of process medium contained in the actuating drive. The temperature sensor is in communication with the evaluation unit and the temperature sensor measures the temperature of the process medium in the actuating drive, generates a temperature signal, and communicates the temperature signal to the evaluation unit.

In an embodiment, the evaluation unit further comprises an adjustment mechanism for imputing and modifying the temperature signal upon which the response threshold depends.

In an embodiment, the test chamber also accommodates a further control terminal which is connected to a temperature sensor and which is in communication with the evaluation unit. The temperature sensor generates the temperature signal and communicates the temperature signal to the evaluation unit.

In an embodiment, the response threshold is proportional to the temperature of the process fluid in the valve chamber.

In an embodiment, the response threshold is proportional to the temperature signal.

In an embodiment, the evaluation unit compares the output pressure signal with a predetermined boundary value. In the event the output pressure signal exceed the predetermined boundary value, the evaluation unit generates an error message.

In an embodiment, the apparatus further comprises a position sensor disposed adjacent to the spindle and which senses the position of the spindle. The position sensor is in communication with the evaluation unit which modifies the response threshold based upon the position of the spindle.

In an embodiment, the evaluation unit comprises a microprocessor.

In an embodiment, the microprocessor of the evaluation unit can generate an error output message based upon the temperature signal or the pressure output signal or both.

In an embodiment, the microprocessor can generate an error output message based upon a ratio of the output pressure signal to the temperature signal.

In an embodiment, the response threshold is dependent upon the position of the spindle. The microprocessor calculates a product of the position of the spindle, the ratio of the output ratio of the output pressure and the temperature signal and, in the event said product exceeds a predetermined value, the evaluation unit generates an error message.

In an embodiment, a housing extension is disposed between the actuating drive and the actuator. The response threshold is dependent upon the type an length of the housing extension.

In an embodiment, an opening is provided in the test chamber to provide communication between the test chamber and the atmosphere.

In an embodiment, the evaluation unit further comprises a chronological filter that has a logical connection with the response threshold and suppresses momentary pressure changes.

Other objects and advantages of the present invention will become apparent from reading the following detailed description and appended claims, and upon reference to the accompanying drawings.

BRIEF DESCRIPTION OF THE DRAWING

For a more complete understanding of this invention, reference should now be made to the embodiment illustrated in greater detail in the accompanying drawings described below by way of examples of the invention.

In the drawing:

FIG. 1 is a sectional view of a control apparatus made in accordance with the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

FIG. 1 shows a preferred embodiment of an inventive control apparatus fashioned as a globe or piston valve. A throttle element 22 is thereby connected to an actuating spindle 20, and forms, together with a valve face 24, a modifiable throttle location in a valve housing 26. The piston movement of the throttle element 22 is caused by an actuating drive 40 that is pneumatically controlled and comprises for this purpose a terminal 50 for a process medium, for the production of a control pressure or, respectively, setting pressure inside the lower half of the drive housing 48, which produces, over an effective surface of a membrane 42, a pressure that works against the force of a spring energy store 46. The spring energy store 46 is thereby supported against a rigid membrane plate 44, with which the actuating spindle 20 is connected via screws 52, 54.

In order to seal a valve inner chamber 28, a bellows 30 is provided that comprises for its part a tight seal, on the one hand at its bellows terminal 32 to the throttle element 22, and on the other hand to a bellows seal 34. The bellows seal 34 thereby forms a first sealing location 10 of the seal of the valve interior chamber 28 to the housing, and is realized in the form of a sealing disk between a housing extension 36, which accepts the constructive length of the bellows 30, and a connection element 38. A second sealing location 12 likewise serves for the sealing of the actuating spindle 20 against the housing, and is here fashioned particularly simply as an O-ring.

However, the control apparatus according to the invention can be realized independent of the type of sealing locations 10, 12. In particular, it is thereby also possible, as is standard given increased tightness requirements, that the first sealing location 10 can be formed by a bellows 30 and the second sealing location 12 can be formed by a stuffing box packing. In addition, both sealing locations 10, 12 can consist of sealing box packings.

A test chamber 14 with control terminals 16, 18 is provided between the first and the second sealing locations 10, 12. A pressure sensor 60 is connected to the control terminal 16, and a temperature sensor 62 is connected to the control terminal 18, in order to enable simultaneous measurement of the pressure and the temperature inside the test chamber 14.

Signal outputs 66, 68 of the two sensors 60, 62 are connected to an evaluation unit 64 for the adapting of a response threshold; these two outputs are connected to one another in this unit and are converted, corresponding to a set relationship, into a signal that is applied to an error status output 70.

A particularly simple embodiment of the invention operates without a temperature sensor in the test chamber 14, whereby the response threshold is then modified corresponding to the operating temperature of the process medium, which has a significant influence on the actual temperature in the test chamber 14. The operating temperature does not have to be determined at the control apparatus, but rather can also be determined at a significant distance from the control apparatus, such as at the valve housing 26 as shown by the terminal 72 and sensor 73, which is connected to the evaluation unit 64.

For a control apparatus that purposively lower the temperature at the actuating drive 40 given particularly hot process media, by means of the housing extension 36 between the actuator 22, 24 and the actuating drive 40, the recognition of the operating temperature is also usually sufficient to infer the temperature in the test chamber 14 with sufficient precision. This is possible because the ambient temperature is in general small in relation to the operating temperature, and a characteristic temperature drop is therefore present for a particular housing extension 36. The relationship, necessary for a particular housing extension 36, between the operating temperature and the temperature reached in the test chamber 14 can thereby be determined theoretically or experimentally.

In particular with the use of field busses (not shown) and the omission of the temperature sensor, the operating temperature can be determined in a simple fashion at the evaluation unit 64.

Advantageously, in an embodiment the evaluation unit 64 comprises an adjustment mechanism with which a signal value corresponding to the operating temperature can be set that directly modifies the response threshold at the evaluation unit 64. By this means, no additional signal connection is required for the communication of the operating temperature.

However, the use of the temperature sensor 62 enables a more precise and more rapid adaptation of the response threshold to the temperature in the test chamber 14 than in the case in which only the operating temperature is taken into account.

The response threshold can be increased proportionally to the measured temperature, in order thereby to take into account with greater precision the increase in pressure caused as temperature increases, according to the gas laws.

However, the evaluation unit can also operate, in a particularly simple way, in the manner of a boundary value switch for the signal output 66 of the pressure sensor 60, whereby the boundary value changes dependent on the signal output 68 of the temperature sensor 62. After a temperature region has been exceeded, the response threshold then increases in steps.

In addition, in the case of constant temperature conditions maintained for a long period of time, the adaptation of the response threshold can take place in large time intervals. If the control apparatus has a temperature sensor 62 connected to the test chamber 14, this sensor is then not read out by the evaluation unit 64 for times of identical temperature relations. For specific applications that cause few changes in the temperature in the test chamber 14 for long periods of time, due to constant process medium temperature and constant external conditions, the temperature sensor 62 can be switched off, or can even be completely dismantled temporarily.

An alternative embodiment according to the invention advantageously comprises a unit 71 that acquires the position of the actuating spindle 20. This unit produces an output signal that represents the position of the actuating spindle 20, and is connected to the evaluation unit 64. By means of the position of the actuating spindle 20, the evaluation unit 64 infers the volume change of the test chamber 14 that occurs at least with bellows 30, and, dependent thereon, influences the response threshold. Volume changes that arise due to piston movements of the actuating spindle 20 can thereby likewise be taken into account in the signal at the error status output 70.

In a further embodiment of the invention, the integration of the evaluation unit 64 into a positioner is provided. For these control apparatus in particular, the taking into account of the position of the actuating spindle 20 can easily be realized, because the pickup in the positioner for the position of the actuating spindle 20 can also be used during operation for the correction of possible changes in volume of the test chamber 14, such as those that occur with the use of the bellows 30. In addition, it is possible for example to do without an additional housing for the evaluation unit 64, if a positioner is already present.

An embodiment of the invention according to which the evaluation unit 64 contains a microprocessor, so that more complex relationships of pressure, temperature and, if necessary, volume and error status, can also be determined, is advantageous. In dependence on the behavior to be expected according to the gas laws, the microprocessor can thereby calculate e.g. the quotient of the pressure and temperature signal, and, given a deviation exceeding the response threshold, can produce a signal at the error status output 70 representing the error. The microprocessor can also form the product of the position of the actuating spindle 20 and the quotient of the pressure and temperature signal, and, given a deviation exceeding the response threshold, can produce a signal representing the error at the error status output 70. In particular for digital positioners, these embodiments can advantageously be combined in that the microprocessor of the positioner likewise executes the operation of the evaluation unit 64.

Another embodiment is also advantageous in which there is an opening 74 to the atmosphere, acting as a throttle, in the test chamber 14 or in one of the control terminals 16, 18. By this means, the pressure inside the test chamber 14 can be equalized in relation to the atmospheric pressure after temporary pressure changes, such as those occurring due to temperature changes. A non-temporary pressure increase at the pressure sensor 60 can thus arise only if a mass flow occurs, e.g. due to a leak in the bellows 30. The influence of the temperature as a disturbing quantity can thereby largely be removed. With such a throttle opening, the operating region of the pressure sensor 60 can be selected significantly smaller than in the case of test chambers 14 that are sealed completely pressure-tight, whereby the minimum detectable leakage due to an opening acting as an artificial leak is increased.

Since for example for globe valves with bellows 30 rapid changes in the positions of the actuating spindle 20 can also cause momentary pressure changes, it is further proposed that the evaluation unit 64 comprise a chronological filter that has a logical connection with the response threshold and suppresses these brief pressure changes. However, if a pressure change exceeding the response threshold remains in existence for a characteristic time period, an error status message indicating a leak is produced at the output 70.

The size of the throttle opening to be selected and the characteristic time span of a chronological filter are dependent on one another and also on the type of control apparatus. The parameters that are optimal for a particular control apparatus can be determined theoretically or experimentally.

The features of the invention disclosed in the above specification, in the drawing and in the claims can be essential for the realization of the various embodiments of the invention, both individually and in any combination.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

We claim:

1. A control apparatus comprising:

an actuating drive connected to an actuator, the actuator comprising a throttle element and a spindle which connects the throttle element to the actuating drive, that actuator further comprising a valve chamber, a valve face and a valve housing, the spindle extending between the actuating drive and the valve chamber, the actuating drive moving the spindle and throttle element so that the throttle element is moved relative to the valve face, the spindle being sealed against the valve housing at first and second sealing locations thereby isolating the valve chamber from the actuating drive, the actuator further comprising a test chamber disposed between the spindle and the valve housing, the test chamber further being disposed between the first and second sealing locations, the test chamber being in communication with at least one control terminal, the control terminal being in communication with a pressure sensor, the pressure sensor being in communication with an evaluation unit for monitoring the operation of the control apparatus, the pressure sensor generating an output pressure signal which is communicated to the evaluation unit, the evaluation unit comparing the communicated output pressure signal with a response threshold dependent on at least one temperature signal, in the event the communicated output pressure signal differs from the response threshold by an amount in excess of a predetermined amount, the evaluation unit generating an error message.

2. The control apparatus of claim 1 further comprising a temperature sensor for measuring the temperature of process medium in the valve housing, the temperature sensor being in communication with the evaluation unit, the temperature sensor measuring the temperature of the process medium in the valve housing, generating the temperature signal and communicating the temperature signal to the evaluation unit.

3. The control apparatus of claim 1 wherein the evaluation unit comprises an adjustment mechanism for inputting and modifying the temperature signal upon which the response threshold depends.

4. The control apparatus of claim 1 wherein the test chamber accommodates a further control terminal which is connected to a temperature sensor which is in communication with the evaluation unit, the temperature sensor generating the temperature signal and communicating the temperature signal to the evaluation unit.

5. The control apparatus of claim 1 wherein the response threshold is proportional to the temperature of process fluid in the actuating drive.

6. The control apparatus of claim 1 wherein the response threshold is proportional to the temperature signal.

7. The control apparatus of claim 1 wherein the evaluation unit compares the output pressure signal with a predetermined boundary value, and in the event the output pressure signal exceeds the predetermined boundary valve, the evaluation unit generates the error message.

8. The control apparatus of claim 1 further comprising a position sensor disposed adjacent to the spindle and which senses the position of the spindle, the position sensor being in communication with the evaluation unit, the evaluation unit modifying the response threshold dependent on the position of the spindle.

9. The control apparatus of claim 1 wherein the evaluation unit comprises a microprocessor.

10. The control apparatus of claim 9 wherein the microprocessor can generate an error message based upon the temperature signal or the pressure output signal or both.

11. The control apparatus of claim 9 wherein the microprocessor can generate an error message based upon a ratio of the output pressure signal to the temperature signal.

12. The control apparatus of claim 11 further comprising a position sensor disposed adjacent to the spindle and which senses the position of the spindle, and wherein the microprocessor calculates a product of the position of the spindle and the ratio of the output pressure signal and the temperature signal, and, in the event said product exceeds a predetermined value, the evaluation unit generates an error message.

13. The control apparatus of claim 1 further comprising a housing extension disposed between the actuating drive and the actuator, the response threshold depending upon on the type and length of the housing extension.

14. The control apparatus of claim 1 further comprising an opening in the test chamber to provide communication between the test chamber and the atmosphere.

15. The control apparatus of claim 1 wherein the evaluation unit further comprises a chronological filter that has a logical connection with the response threshold and suppresses momentary pressure changes.

* * * * *